United States Patent

[11] 3,602,362

| [72] | Inventor | Bernard E. Jacobson<br>Cedar Falls, Iowa |
|---|---|---|
| [21] | Appl. No. | 689,500 |
| [22] | Filed | Dec. 11, 1967 |
| [45] | Patented | Aug. 31, 1971 |
| [73] | Assignee | Universal, Inc.<br>Hudson, Iowa |

[54] CONVEYOR MEANS
5 Claims, 7 Drawing Figs.

[52] U.S. Cl. ................................................. 198/128
[51] Int. Cl. ................................................. B65g 31/02
[50] Field of Search........................................ 198/100, 128, 233, 95, 90

[56] References Cited
UNITED STATES PATENTS

| 1,080,501 | 12/1913 | Tibyrica | 198/128 X |
| 2,153,037 | 4/1939 | Chaffins | 198/233 X |
| 2,596,265 | 5/1952 | Manierre | 198/233 X |
| 2,618,374 | 11/1952 | Rahlson | 198/140 X |
| 3,285,392 | 11/1966 | Wood | 198/128 |
| 3,332,534 | 7/1967 | Mills | 198/128 |

*Primary Examiner*—Edward A. Sroka
*Attorney*—Dick, Zarley, McKee and Thomte

ABSTRACT: A conveyor of the slinger type for transferring material such as grain or the like from a truck, wagon or the like to a vertical bucket elevator. The slinger conveyor includes a horizontal belt portion and an upward curved belt portion extending therefrom. The material to be conveyed is deposited on the horizontal belt portion and is accelerated therealong. The material attains substantially full belt speed as it reaches the upward curved portion due to the centrifugal force pressuring it to the conveyor belt surface. The incline of the upward curved portion and the high conveyor belt speed directs and projects the material upwardly into a hood which in turn directs the material into the bucket elevator intake hopper.

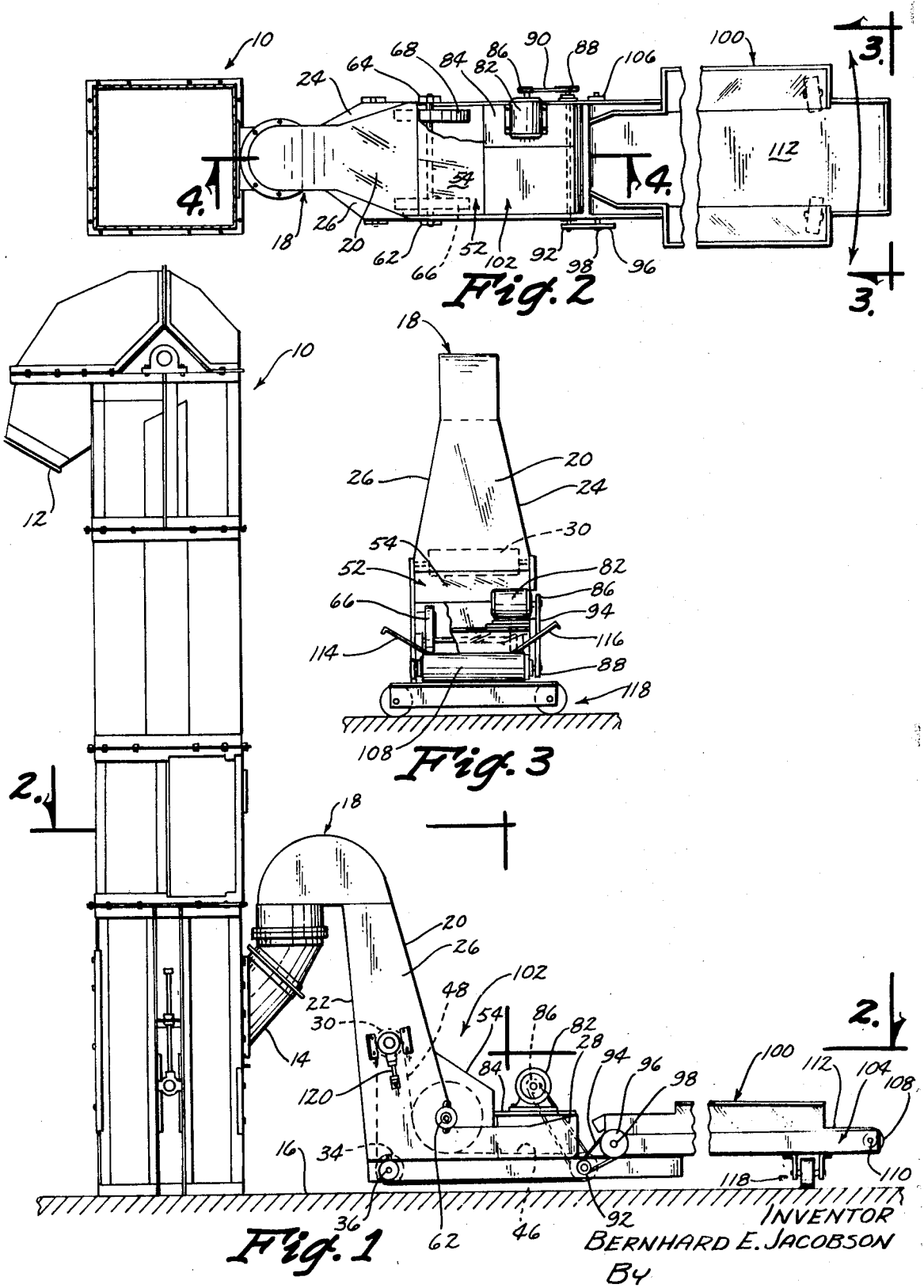

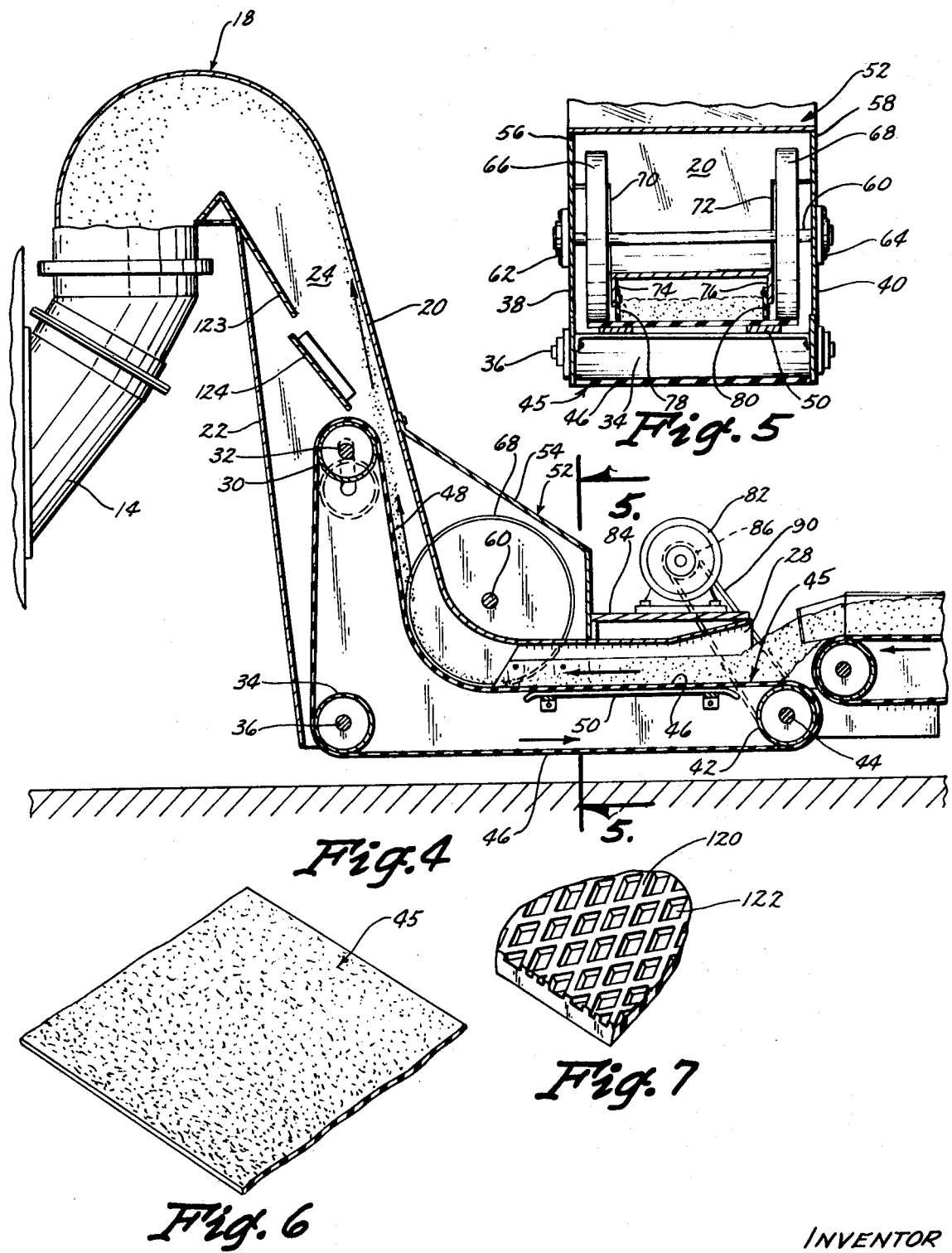

CONVEYOR MEANS

It is necessary to use some type of an inclined conveyor when transferring grain from a dump truck, wagon or the like to a vertical bucket elevator which is on the same ground or floor level due to the height difference between the discharge level of the truck, wagon or the like and the intake level of the bucket elevator. The employment of a conventional belt conveyor to transfer material from the truck to the bucket elevator presents an awkward space problem due to the 20° incline limit of conventional belt conveyors. Thus, this makes an unuseable horizontal space of about three times the distance the material has to be raised to flow into the bucket elevator hopper.

Therefore, it is a principal object of this invention to provide a belt conveyor system which occupies a minimum amount of horizontal space.

A further object of this invention is to provide a conveyor which combines a horizontal belt conveyor with a belt slinger extending upwardly therefrom.

A further object of this invention is to provide a conveyor means including a slinger portion which discharges grain substantially vertically into a hood or gooseneck spout, which in turn directs it into an elevator hopper.

A further object of this invention is to provide a conveyor system which may be pivoted about a vertical axis with respect to a elevator hopper.

A further object of this invention is to provide a conveyor means which may be used independently of any particular conveyor.

A further object of this invention is to provide a conveyor means including a slinger portion having a large capacity in relation to its size.

A further object of this invention is to provide a conveyor means including a slinger means which permits a larger amount of material to be conveyed than is possible with conventional horizontal-inclined conveyor systems.

A further object of this invention is to provide a conveyor means which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side elevational view of the conveyor means illustrating the same in combination with a vertical bucket elevator and a low profile conveyor means;

FIG. 2 is a sectional view as seen along line 2—2 of FIG. 1;

FIG. 3 is a sectional view as seen along lines 3—3 of FIG. 2 with portions thereof cut away to more fully illustrate the invention;

FIG. 4 is an enlarged sectional view as seen along lines 4—4 of FIG. 2 with portions thereof cut away to more fully illustrate the invention;

FIG. 5 is a sectional view as seen along lines 5—5 of FIG. 4;

FIG. 6 is a fragmentary top perspective view of the conveyor belt which is used in the conveyor means; and FIG. 7 is a fragmentary top perspective view of a modified form of the conveyor belt which may be used with the conveyor means of this invention.

The numeral 10 generally designates a conventional vertical elevator of the bucket type including a discharge end 12 and a hopper portion 14 which is spaced above the supporting surface 16. A hood 18 is rotatably connected to the upper end of hopper means 14 and extends upwardly therefrom as seen in FIG. 4 and thence downwardly. Hood 18 includes a front 20, back 22 and sides 24 and 26. As seen in FIG. 4 and FIG. 5, the lower end of front 20 extends substantially horizontally outwardly therefrom. It can also be seen in the drawings that the lower ends of sides 24 and 26 extend therefrom along the sides of the lower forward end 28 of front wall 20 to give the hood a substantially "L" shape.

A head pulley 30 is rotatably mounted on a shaft 32 which extends between sidewalls 24 and 26 while a knee pulley 34 is rotatably mounted on a shaft 36 which extends between frame members 38 and 40 which are secured to the lower ends of sidewalls 24 and 26 respectively. A tail pulley 42 is rotatably mounted on a shaft 44 which extends between frame members 38 and 40 at a point forwardly of knee pulley 34 as illustrated in FIG. 4. A conveyor belt 45 extends around the pulleys 30, 34 and 42 as illustrated in FIG. 4 and includes a horizontal belt portion 46 and an inclined belt portion 48. A belt support pan 50 extends between frame members 38 and 40 below belt portion 46 to support the belt.

A cover 52 is mounted on the front wall 20 and includes a front wall 54 and opposite sidewalls 56 and 58. A shaft 60 is mounted in bearings 62 and 64 which are secured to sidewalls 56 and 58 respectively as best illustrated in FIG. 5. A pair of radius wheels 66 and 68 are mounted on shaft 60 adjacent opposite ends thereof and are adapted to engage belt 45 to keep the belt in the cross-sectional shape seen in FIG. 4. It can be seen in FIG. 5 that radius wheels 66 and 68 are positioned in cut away areas 70 and 72 respectively formed in front wall 20 of hood 18. As seen in FIG. 5, front wall 20 includes a pair of downwardly extending flanges 74 and 76 which are positioned adjacent the inner surfaces of radius wheels 66 and 68 respectively. A pair of flexible adjustable rubber skirts 78 and 80 are secured to flanges 74 and 76 respectively and prevent leakage of the material outwardly from the belt as illustrated in FIG. 5. A motor 82 is mounted on a bracket 84 and is provided with a drive pulley 86. A pulley 88 is operatively connected to shaft 44 by a belt 90 and the other end of shaft 44 is provided with a pulley 92 which receives a belt 94 extending therefrom. Belt 94 extends around a pulley 96 mounted on one end of a shaft 98 which is rotatably mounted at one end of a horizontal conveyor means 100. Conveyor means 100 is of conventional design and is merely illustrated to illustrate one form of a conveyor means which may be used with the slinger conveyor means generally designated by the reference numeral 102. Conveyor means 100 includes a frame means 104 which supports a head pulley 106 on shaft 98 and tail pulley 108 mounted on shaft 110. A conveyor belt 112 extends around pulleys 106 and 108 as illustrated in the drawings. Conveyor means 100 includes a pair of angularly disposed sidewalls 114 and 116 which are designed to receive and keep the material on the belt 112. A caster wheel assembly 118 is secured to the underside of frame means 104 to permit the conveyor means 100 and conveyor means 102 to be easily pivoted with respect to the bucket elevator hopper means 14. Frame means 104 may be operatively secured to the conveyor means 102 by any convenient means such as by securing the same to frame members 38 and 40. It should be noted that conveyor means 100 could be replaced by an auger, chain drag conveyor, or even possibly the outlet of a bin or large hopper. In other words, the conveyor means 100 could be replaced by any suitable means which would deposit the material on the upper surface of the conveyor belt 45. Conveyor belt 45 may be of conventional construction such as marketed under the name "Traction Top" by U.S. Rubber Company. This conveyor belt consists of 28 or 32 ounce standard cotton duct having the traction-top surface as the top cover with a suitable friction surface serving as the bottom cover. This conveyor belt insures that sufficient friction will be present between the material and the conveyor belt so that the material will accelerate therealong. FIG. 6 illustrates the conveyor belt while FIG. 7 illustrates a modified version of a conveyor belt that works satisfactorily in this environment. As seen in FIG. 7, the conveyor belt 45' consists of a plurality of intersecting ribs 120 which define a plurality of pockets 122 therebetween. The surface thereby provided on the conveyor belt 45' does provide a sufficient amount of friction between the material thereon and the belt itself to insure that the material will be accelerated on the conveyor belt.

In operation, motor 82 is activated to cause belt 45 to be rotated. The drawings illustrate that the conveyor means 100 is also driven by the motor 82 as previously described but it should be understood that conveyor means 100 can be powered by any convenient means. The activation of motor 82 causes the belt to be rotated so that the material deposited thereon by the conveyor means 100 will be accelerated along the horizontal portion of the conveyor and when the material reaches the upward curved portion of the belt it attains substantially full belt speed due to the centrifugal force pressuring the material into the belt surface. The steep incline of the belt and the high speed of the belt directs and projects the material upward into the hood 18 which in turn directs it into the elevator hopper 14. Preferably, the conveyor belt 45 should travel at approximately 1000 feet per minute while the conveyor belt 112 on conveyor means 100 should travel approximately 350 feet per minute. It should be noted that the angle of the inclined belt portion 48 and the angle of front 20 of hood 18 is such that the intersection of the angles formed by the inclined surface 48 and the front 20 will be approximately 5° to avoid impingement of the material against the housing and to eliminate ricochet. The radius wheels 66 and 68 maintain the belt in the shape seen in FIG. 4 and the adjustment means 120 on head pulley 30 can be used to maintain the proper tension in the slinger conveyor belt. Baffles 123 and 124 are provided in hood 18 to prevent the material from falling downwardly behind the conveyor belt 45 if the elevator should kick some material back into the hood.

The conveyor means 102 and 100 can be rotated with respect to hopper means 14 by simply pivoting the same on caster wheel 118 so that the apparatus can be swung out of the truck or wagon passageway when not receiving material therefrom. An alternative method of swinging the apparatus would be to pivot the same about the axis of the conveyor head shaft 44. Thus it can be seen that the space problem has been solved while still employing a belt conveyor system by combining a horizontal belt conveyor with a belt grain slinger. The combination reduces the unusable horizontal space to a distance equal to or less than that which the grain or material must be raised to enter the elevator. It can also be seen that a conveyor slinger means has been positioned so as to discharge material vertically or nearly so into a hood or gooseneck spout which in turn directs it into the elevator hopper. The apparatus provides a low profile horizontal conveyor which occupies a minimum of vertical space. The capacity of the slinger conveyor means in relation to its size is phenomenal which insures that the trucks and wagons or the like can be unloaded faster than with a horizontal-inclined conveyor. Thus it can be seen that the apparatus accomplished at least all of its stated objectives.

I claim:

1. In combination,
a material elevator means having upper and lower ends with a material discharge means adjacent its upper end and a material intake means spaced above its lower end,
a hood means operatively secured to said material intake means,
a belt slinger conveyor means including a horizontal portion and an inclined portion extending upwardly into said hood means,
power means connected to said belt slinger conveyor means,
said belt slinger conveyor means adapted to receive material on its horizontal portion, said material being accelerated along the length of said horizontal portion and being propelled upwardly into said hood means by said inclined portion,
said hood means and said belt slinger conveyor means being operatively pivotally secured about a vertical axis to said elevator means.

2. In combination,
a material elevator means having upper and lower ends with a material discharge means adjacent its upper end and a material intake means spaced above its lower end,
a hood means operatively secured to said material intake means,
a belt slinger conveyor means including a horizontal portion and an inclined portion extending upwardly into said hood means,
power means connected to said belt slinger conveyor means,
said belt slinger conveyor means adapted to receive material on its horizontal portion, said material being accelerated along the length of said horizontal portion and being propelled upwardly into said hood means by said inclined portion,
said hood means including an inclined front wall member, said inclined portion of said belt slinger conveyor means propelling said material upwardly into contact with said front wall member, the angle of said inclined belt portion and the angle of said front wall member being such that the intersection of said angles is approximately 5°.

3. A belt conveyor means, comprising,
a horizontal belt portion and an inclined belt portion extending upwardly therefrom,
a hood means extending at least partially over said inclined belt portion,
said hood means including an inclined front wall member,
the angle of said inclined belt portion and the angle of said front wall member being such that the intersection of said angles is approximately 5°,
power means connected to the conveyor means, said horizontal belt portion adapted to receive material thereon, said material being accelerated along the length of said horizontal belt portion and being propelled upwardly into contact with said front wall member of said hood means.

4. The conveyor means of claim 3 wherein the belt speed of said belt portion is approximately 800–1,000 feet per minute.

5. In combination,
a material elevator means having upper and lower ends with a material discharge means adjacent its upper end and a material intake means spaced above its lower end,
a hood means operatively secured to said material intake means,
a belt slinger conveyor means including a horizontal portion and an inclined portion extending upwardly into said hood means,
power means connected to said belt slinger conveyor means,
said belt slinger conveyor means adapted to receive material on its horizontal portion, said material being accelerated along the length of said horizontal portion and being propelled upwardly into said hood means by said inclined portion,
said hood means including an inclined front wall member having its lower end portion positioned forwardly of said inclined portion of said belt slinger means, the lower end portion of said front wall member being positioned forwardly of its upper end portion. Said inclined portion of said belt slinger conveyor means propelling said material upwardly into contact with said front wall member, the angle of said inclined belt portion and the angle of said front wall member being such that the intersection of said angles forming an acute angle to avoid impingement of said material against said front wall member and to prevent said material from ricocheting away from said front wall member.